United States Patent [19]

Strömberg

[11] Patent Number: 4,542,962
[45] Date of Patent: Sep. 24, 1985

[54] IMAGE-STABILIZED OPTICAL INSTRUMENT, SUCH AS TELESCOPE AND CAMERAS

[76] Inventor: Rolf Strömberg, Köpenhamnsgatan 14, 163 42 Spånga, Sweden

[21] Appl. No.: 474,583
[22] PCT Filed: Jun. 18, 1982
[86] PCT No.: PCT/SE82/00222
 § 371 Date: Feb. 24, 1983
 § 102(e) Date: Feb. 24, 1983
[87] PCT Pub. No.: WO83/00067
 PCT Pub. Date: Feb. 6, 1983

[30] Foreign Application Priority Data
 Jun. 25, 1981 [SE] Sweden .................................. 8103984

[51] Int. Cl.$^4$ .............................................. G02B 27/64
[52] U.S. Cl. ................................................... 350/500
[58] Field of Search .......................... 350/500; 354/70; 358/222

[56] References Cited
U.S. PATENT DOCUMENTS
 3,884,584  5/1975  Linder ................................. 350/500

FOREIGN PATENT DOCUMENTS
 414483  2/1974  U.S.S.R. .............................. 350/500

Primary Examiner—Jon W. Henry
Attorney, Agent, or Firm—Lewis H. Eslinger

[57] ABSTRACT

An image-stabilized optical instrument, such as telescopes and cameras, having an objective (1) and first (2) and second (6) optical reflecting elements following in the path of rays after the objective and, wherever applicable, an ocular (9) arranged after said elements, is characterized by the fact that the whole objective, or one or more parts of the latter, depending on the purpose and the optics used, together with the first optical element (2) forms a stabilized unit, which is freely rotatable, in relation to the casing (7) and the second optical element (6) fixed thereto and, wherever applicable, the ocular (9), around two pivot axes which usually intersect. The suspension point (A,B,C) then substantially lies on the imaginary extension (L) of the optical axis of the objective after the first optical element, if the second optical element would not have been in the path of the optical axis.

13 Claims, 11 Drawing Figures

IMAGE-STABILIZED OPTICAL INSTRUMENT, SUCH AS TELESCOPE AND CAMERAS

The present invention refers to an image-stabilized optical instrument, such as telescopes and cameras.

It is generally known that telescopes with a high magnification cannot be held by hand without difficulty because the observed image is too unsteady to be capable of being tracked accurately. This is due to the fact that the unavoidable turning movements of the telescope around all axes orthogonal to an original visual line cause corresponding but greater movements of the image. This problem increases with increasing magnification. A method of handling this is to isolate the telescope as a whole from such movements (inertia stabilization) for example by servo mechanisms, gyro devices or the like. Common features of these solutions are that they are complicated, increase the weight and require a considerable operating power. Therefore, a great many solutions have been presented where only a part of the optics is stabilized and where the casing of the telescope and at least the ocular remain unstabilized. The optics is dimensioned so that the stabilized element functions as a "reference element", i.e. the telescope image follows the turning movements of said element. If this element is stabilized, the image also appears stabilized.

When studying existing solutions it is seen that image stabilization according to the abovementioned method can take place substantially in three different ways with regard to the position of the stabilized elements.

(1) Stabilization takes place before the objective, outside the telescope. This can take place by variable prisms or by mirrors. The complexity will here be great, since these "extra" optical elements are not needed in ordinary telescopes. Also, these elements must be made large and with great precision.

(2) The objective is stabilized with the pivot point situated in or near the focal plane. This solution has up to now been unpractical owing to the fact that in practice such an instrument will be very large. Image reversal by mirrors or prisms is also unsuitable here.

(3) The objective is unstabilized and the stabilizing elements are within the telescope. Most existing solutions belong to this group. A considerable disadvantage is common to them all, namely that high demands are made on the off-axis exactitude of the objective, if aberrations are to be avoided when the telescope is turned in relation to the visual line. Most instruments of this group also require complicated optics.

Moreover, many solutions of stabilized monocular instruments have been presented, even if few if any of them can be made simple and at the same time with good data. Nevertheless there are few solutions of stabilized binoculars described, and these are as a rule very complicated. This has to do with the fact that it is very difficult to find a solution which will give an exactly equal degree of stabilization for the two parts of the binoculars, to that doubling of the images or blur does not arise. Generally, all monocular solutions can be converted into binocular ones, if the two stabilized optical elements of the left and right parts of the binoculars are connected by mechanical bridging means. This is made according to the U.S. Pat. No. 2,829,557 which requires very great precision in a purely mechanical respect, and this, together with the general mechanical complexity with many pivot axes, makes this type of solution impractical. Consequently, there is a need of a solution where a single part stabilizes the image in both parts of the binoculars. Such solutions are known, but up to now they have been very complicated in a purely optical respect. In the U.S. Pat. No. 3,460,881 such a solution is shown, where a plurality of mirrors are provided but where the image reversal finally takes place with lenses. Another similar solution is shown in the U.S. Pat. No. 3,915,550, where besides some notes are set forth quite generally about stabilizing binocular instruments and about problems in connection therewith. Solutions have also been presented where beam splitting takes place after the stabilized element. This arrangement certainly allows using both eyes, but the light intensity necessarily becomes reduced and no stereoscopic vision is obtained.

From the above it is seen that no simple and at the same time well functioning solution has been known up to the present time, neither for monocular nor for binocular instruments.

The purpose of the present invention is, among other things, to realize monocular and binocular instruments with image stabilization without any of the disadvantages mentioned above.

This is possible by the invention having the characteristics defined in the claims.

An advantage of the invention is that the objective is stabilized which has a result that the introduction of image stabilization makes no further demand on the objective, compared to an unstabilized instrument; accordingly, standard objectives may be used with advantage.

Among other advantages the following are noted: the optics may be varied in a great many different ways. Only the four reflecting surfaces needed for image reversal are necessary in the simplest construction of telescopes. The stabilized part has a high moment of inertia in relation to the length of the instrument. The pivot point can be placed both within and outside the beam of rays from the objective, which results in the greatest freedom in the choice of bearing being obtained. A simple type of stabilized binoculars is made possible without the disadvantages from which other structures of similar types have suffered up to now.

Other advantages and characteristics of this invention will be seen from the following specification. Although the latter emphasizes the stabilization of the telescope image, it is obvious that optics constructed according to the invention may be used without any hindrance in all connections where a focused image is to be stabilized around at least one axis. Another conceivable sphere of utilization is the stabilization of laser light.

For the best possible understanding of the invention some concepts frequently occurring later should be explained more closely here.

The angle which the telescope casing is turned at a certain moment in relation to the stabilized part is here referred to as angular deflection. When the angular deflection equals zero, the stabilized part is in its central position. By the "optical axis" is henceforth meant the line which is defined by the optical axis of the objective lens system when the angular deflection equals zero. Finally, the difference between dimensioning for telescope stabilization and camera stabilization must be elucidated. In the case of image stabilization of a camera the focused rays from the lens are to be stable in relation to the film plane, irrespective of the movements of the camera. In the case of image stabilization of a telescope the image is to be seen stable in relation to the environment, which requires a small modification of the degree of stabilization, compared to dimensioning for 100% camera stabilization. How this is achieved for various embodiments of this invention will be shown later, but generally optics dimensioned for camera stabilization may be converted into telescope stabilization by modifying the degree of stabilization with a factor $(1 \pm 1/F)$, where F is the magnification of the telescope and where the minus sign applies to instruments in which the image is seen upright.

In order that an image-stabilized telescope may be usable several requirements in respect to the mechanics must be satisfied. The centre of gravity of the stabilized part must be situated at the pivot point, a weak spring force must tend to drive the stabilized part into a central position, and a viscous damping must be provided so that resonance oscillations are damped. This method of stabilization, being well known previously, will not be described further in detail here. Yet, it may be pointed out that stabilization can take place also by means of a gyro. This offers very good stabilization qualities but requires more complicated mechanics at the same time as the demand for operating power is a disadvantage.

Since the stabilized part of optics constructed according to this invention has a high moment of inertia in relation to the length of the instrument, the firstmentioned simpler method of stabilization without a gyro is very suitable here.

Generally, the description of mechanics in the following specification is very summary, partly because it is non-essential to the invention how the mechanics is designed in detail, partly by the circumstance that the design of such mechanics in connection with image stabilization is well-known. Yet, it should be noted that since the stabilized part in certain embodiments of this invention has an irregular shape, particular attention must be devoted to minimizing the inertia product around all axes orthogonal to the visual line.

The invention will be described more in detail in the following in the form of examples with reference to the drawing in which FIG. 5 shows an element included therein, FIG. 6 diagrammatically shows the use of a second type of optical elements and FIG. 7 another type of optical elements in connection with the invention, and FIGS. 8 and 9 diagrammatically show the invention applied to a pair of binoculars.

Figure 1:
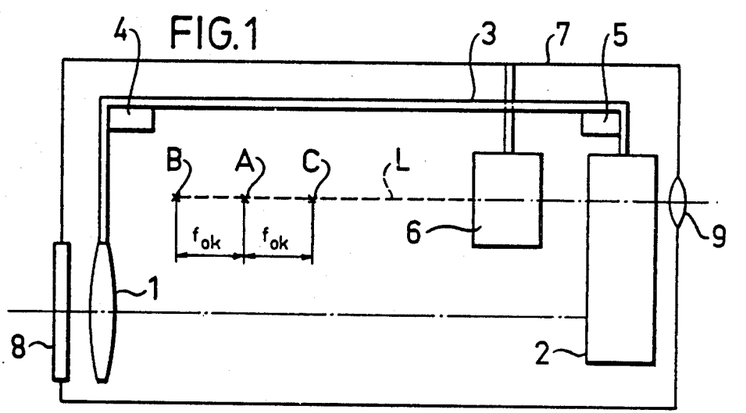
FIGS. 1 to 3 show the principle of the invention applied to a telescope, FIG. 4 diagrammatically shows the use of a certain type of optical elements in a telescope.
Figure 2:
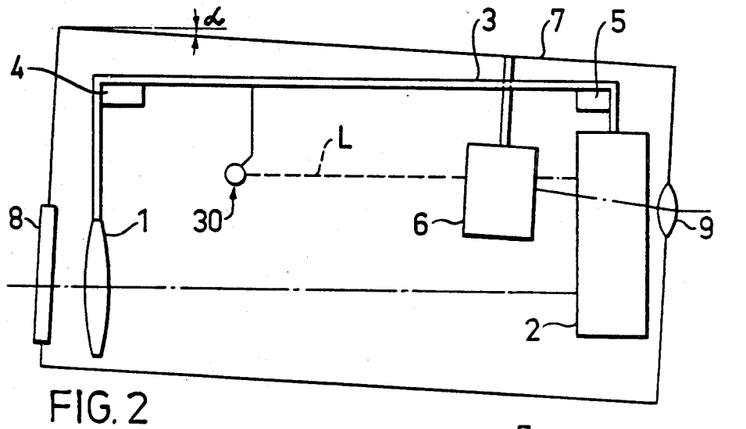
Figure 3:
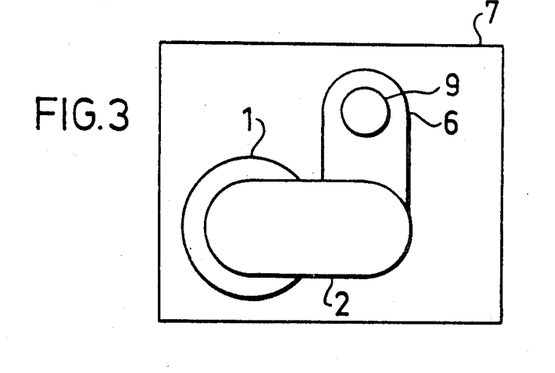

The general principle of the present invention is explained in connection with FIGS. 1, 2 and 3 diagrammatically showing the invention in connection with a telescope. The stabilized part consists of the objective lens 1 together with the optical element 2 which may consist of any conceivable combination of lenses, prisms, mirrors and the like, but a requirement is that the element contains at least one reflecting surface. It should be noted that this stabilized part is the most important one for the invention. Its form can be varied in a great many different ways and other optical elements may be added, but this part is found in some form or other in all variants.

The objective 1 and the optical element 2 are rigidly fixed to each other by an arm or bridging member 3 to which two suitably dimensioned counterweights 4 and 5 may advantageously be fixed. A second optical element 6 is, like the ocular 9, rigidly fixed to the casing 7 of the telescope and is accordingly unstabilized. Light rays from an observed object first passes the protective plane window 8 and then the objective 1, thereupon passes the elements 2 and 6 and finally the ocular 9. The stabilized part is rotatably mounted, substantially without friction, at a pivot point 30 (not shown in FIG. 1), the exact position of which will be discussed later. In the case of stabilizing a telescope image, freedom of rotation exists about all axes at right angles to the visual line but not around the latter. The function in general is best understood if FIG. 2 is considered which shows the same telescope as FIG. 1 but an angular deflection $\alpha$ has now taken place; thus the casing 7 has been turned the angle $\alpha$ unintentionally around the pivot point 30. The position of the stabilized part remains the same as is shown in FIG. 1. From this it follows that the position of the light rays after reflection in element 2 is independent of the position of the unstabilized optics. If the pivot point is correctly positioned, the unstabilized element 6 directs the light towards the ocular 9 in such a way that a stable image is obtained, irrespective of the angular deflection.

Provided that the light from the observed remote object at first only passes fully stabilized optics and then only passes unstabilized optics, the following may be shown: if the pivot point is situated exactly where the focus A of the objective (FIG. 1) would have been located if the unstabilized element 6 would not have been there, dimensioning for camera stabilization is always obtained irrespective of how the optical elements 2 and 6 are constructed. Accordingly, these may be constructed as porro prisms, plane mirrors, cube corner elements or the like, and they may also, as long as at least one reflecting surface is also included, contain lenses. The abovementioned rule, with the condition mentioned above, is of universal validity.

The telescope shown in FIGS. 1, 2 and 3 does not entirely satisfy the above requirements; the covering disc 8 is obviously unstabilized, but the optical effect of this window may be neglected if its surfaces are plane and parallel.

In the case of dimensioning for telescope stabilization the pivot point must be displaced a little from the point which affords camera stabilization (point A) along the line defined by the optical axis, where this would have been situated if the unstabilized element 6 is supposed removed. To obtain a maximum of clearness of the presentation this line will henceforth be called line L and is shown dashed in all figures. How far and in which direction the pivot point is to be displaced from point A long line L depends on the focal length $f_{ok}$ of the ocular and how the unstabilized optical element 6 is constructed, provided that this element does not contain any lenses. It may be noted that if the unstabilized element 6 contains one or more lenses the length $f_{ok}$ has to be replaced by the length D, where D equals the focal length of the objective divided by the magnification of the instrument. If there are no lenses between objective and ocular, then obviously $D=f_{ok}$. Some special cases are described below where for simplicity no lenses are included beween objective and ocular.

Figure 4:
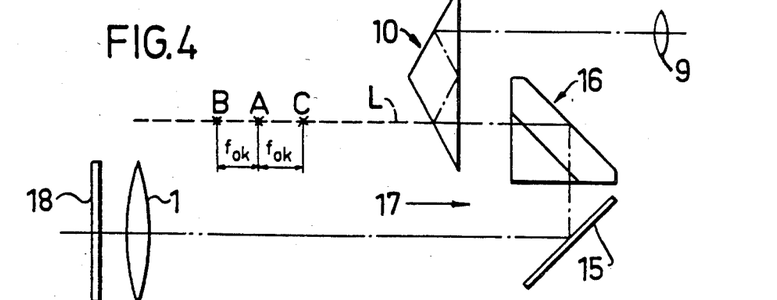
Figure 5:
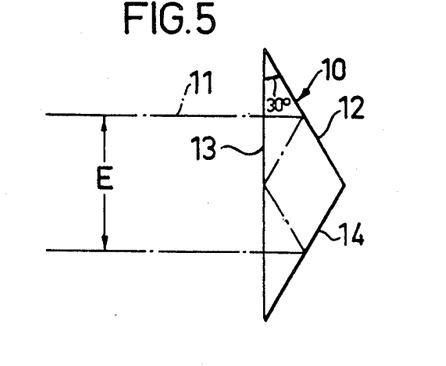

In FIG. 4 the essential parts of a telescope are shown, where a threefold reflecting prism 10 is included, shown more in detail in FIG. 5. This element has the property of reflecting the light non-rotated about the optical axis 11 like a plane mirror but translated the length E, provided that the reflecting planes 12, 13 and 14 are oriented such that each of them contains a line which is parallel to a line in the other planes. For a more detailed description the U.S. Pat. No. 3,475,073 is referred to in which other alternative elements with equivalent optical properties are also shown. Furthermore, in this telescope a plane mirror 15 and a roof prism 16 are included which are oriented so that the three reflecting surfaces thereof are at right angles to each other. These surfaces essentially form a cube corner, and henceforth the plane mirror 15 and the roof prism 16 will, accordingly, together be regarded as a cube corner element 17.

Light from the observed object passes the window 18 and the objective 1, is then reflected in the cube corner element 17 stabilized together with the objective before passing the ocular 9 after threefold reflection in the unstabilized prism 10. As seen, the telescope shown in FIG. 4 has exactly the same fundamental construction as the one described in connection with FIGS. 1 and 2; the threefold reflecting element 10 in FIG. 4 thus corresponds to the element 6 in FIG. 1, and the cube corner element 17 in FIG. 4 corresponds to the element 2 in FIG. 1. Consequently, in the case of dimensioning for camera stabilization the pivot point is to be placed where the focus of the objective would have been in the absence of the unstabilized prism 10, point A. In the case of dimensioning for telescope stabilization the optical properties of the unstabilized element 10 require that the pivot point is here placed at point C; the pivot point is thus displaced from point A along the line L the length $f_{ok}$ towards the observer. It should be noted that image reversal is also obtained if the two elements 10 and 17 change places; thus still another variant is possible which includes these elements, which can be image stabilized according to the invention and which at the same time will give image reversal, naturally the one in which the cube corner element 17 is unstabilized and the prism according to FIG. 5 is stabilized together with the objective. All essential properties characteristic of the telescope shown in FIG. 4 are found also in this new variant, except the placing of the pivot point in the case of dimensioning for telescope stabilization. In this case the pivot point has to be displaced the length $f_{ok}$ along the line L from the point A but from the observer, so that in this variant it is situated at point B. This point B is found, like points A and C, also in FIGS. 1 and 6.

If the optical elements described above are used, the light is reflected six times between objective and ocular. This may seem to be an unnecessary complexity compared, for example, to a porro system where only four reflections occur. However, such a system may also be used with advantage in connection with image stabilization according to this invention, which is described in connection with FIG. 6. Here the essential parts of a telescope are shown, containing four mirrors arranged in a well-known way for image reversal. The two mirrors 21 and 22 at right angles to each other are rigidly connected to the objective 1, said combination being stabilized. The mirrors 24 and 25 at right angles to each other are fixed to the casing (not shown) and are thus unstabilized. As seen, the fundamental construction is exactly the same as in FIG. 1, and consequently the pivot point for camera stabilization has to be where the focus of the objective would have been located if the unstabilized mirrors 24 and 25 are supposed removed, point A. In the case of dimensioning for telescope stabilization the pivot point must in this case be divided into two axes 26 and 27 at right angles to each other and spaced apart, but still the requirement is valid that these axes are to intersect the line L. It must be noted that here balance must exist about both axes, separately.

Figure 6:
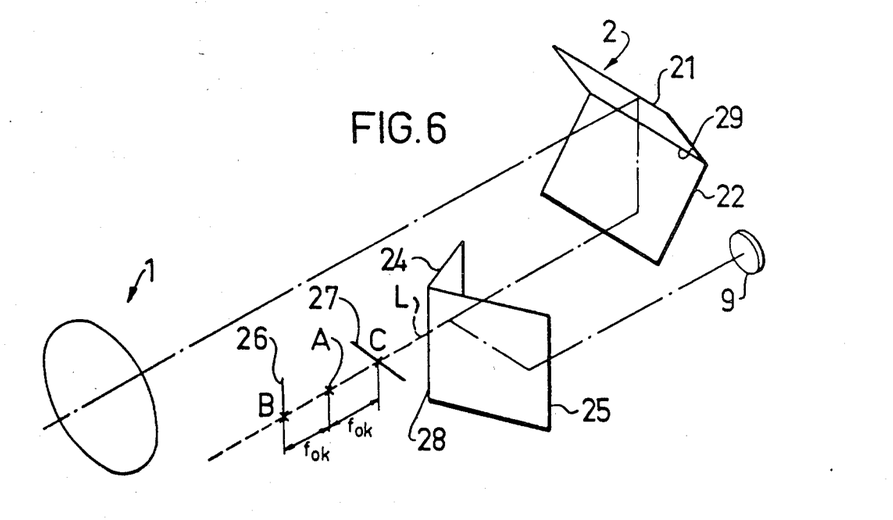

The stabilized part alone must thus be balanced around an axis and the stabilized part, together with the part of the bearing which is stabilized around only one axis, corresponding to the "middle part" of a cardan ring, must be balanced around the other axis. The pivot axis 26, which is parallel to the intersecting line 28 of the unstabilized mirrors, is to be placed so that the axis 26 goes through point B, and the pivot axis 27, which is parallel to the intersecting line 29 of the stabilized mirrors, is to be placed at point C. The two pivot axes 26 and 27 are thus to be placed at the distance $f_{ok}$ from the focus A of the objective 1, where this focus would have been located without the unstabilized mirrors 24 and 25, but on either side of this point. Consequently, the distance between the two pivot axes will here be equal to $2 f_{ok}$, which may cause some complication at the balancing. Therefore, it will probably in practice be a good alternative in this case to dimension for camera stabilization and accept the small deterioration which results and which manifests itself such that the image is seen to be stable in relation to the field stop and not in relation to the environment. In practice this is of importance only when the casing makes extremely rapid movements, such as may be the case, for example, when the instrument is fixed to a vibrating support.

If for this reason dimensioning for camera stabilization is not suitable, other methods may be used where the disadvantage of separate pivot axes is avoided. Dimensioning for telescope stabilization need not be brought about here by moving the pivot point or both pivot axes from the point realizing dimensioning for camera stabilization but, for example, by placing a lens (or several lenses) such that the requirement that light from an observed object first is to pass only fully stabilized optics and then is to pass only unstabilized optics is not satisfied (the flat covering disc in front of the objective is neglected). Accordingly, for example, a negative lens stabilized around one or two axes can be placed so that the light passes this lens before it passes the ocular, or the flat covering disc in front of the objective may be replaced by a positive lens which, if desired, may form part of the objective lens system. It should be noted that if the methods exemplified above are used, the pivot point generally cannot be placed exactly on line L. These small modifications which preferably influence the degree of stabilization to only a relatively slight extent are intended to be included in the invention, but the gain will probably in most cases be small compared to the increase of complexity. The "extra" lenses may also introduce aberrations.

Still another method of realizing dimensioning for telescope stabilization in structures where the pivot point is placed for camera stabilization should be mentioned. This method is aimed at getting the stabilized part, by servo mechanisms or other means, to move with a certain fraction of the turning movements of the casing so as in this way to modify the degree of stabilization with a certain factor. It was mentioned above that this factor is to be equal to $(1 \pm 1/F)$, where F is the magnification of the telescope and where the minus sign applies to instruments in which the image is seen upright. If this is the case, then the following relation must be true: $\phi = \alpha/F$, where $\alpha$ is the angle turned by the casing and $\phi$ is the proportional movement of the stabilized part in the same direction.

Figure 7:
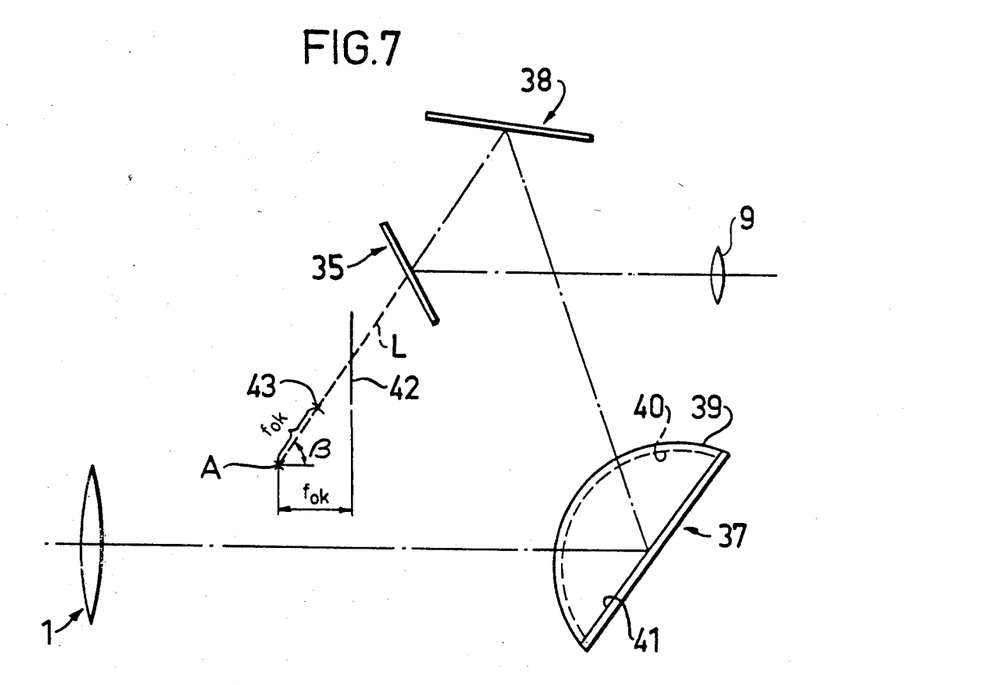

Below a construction is described in connection with FIG. 7, which permits a very great angular deflection at the same time as the mirrors present remain relatively small depending on the extremely small distance between the pivot axes and the unstabilized mirror. The telescope is here assumed to be held horizontally and the angular deflection equals zero. The optical axis is then situated wholly in the horizontal plane. The mirror 35 is unstabilized and the stabilized part accordingly consists of the objective 1 together with a pair of roof mirrors 37 and a mirror 38. The pair of roof mirrors 37, which may be replaced by a corresponding prism, consists of two mirrors 39 and 40 at right angles to each other, the intersecting line 41 of which is in the horizontal plane.

This kind of optics is described in detail in U.S. Pat. No. 3,298,770. For camera stabilization the pivot point, according to the general rule previously described, has to be at point A, where the focus of the objective would have been located if the mirror 35 would not have existed. In the case of dimensioning for telescope stabilization the pivot point must here be divided into two axes 42 and 43 at right angles to each other, where the axis 43 affords freedom of rotation in the horizontal plane and the axis 42 in the vertical plane. As is seen in FIG. 7 the pivot axis 43 is displaced from point A the length $f_{ok}$ towards mirror 35 along the line L and the pivot axis 42 is likewise displaced the length $f_{ok}$ from point A, but in this case parallel with the visual line along the line L. The relations set forth above are true irrespective of the angle $\beta$ (see FIG. 7).

If the use of different pivot axes according to the above is not desired, there is of course the possibility of placing the pivot point for camera stabilization and introduce proportional influence as described before. Another possibility is to place the pivot point where axis 43 and line L have their intersection. As the pivot axis 43 then is placed for telescope stabilization in the horizontal plane, only very little proportional influence is needed in the vertical plane only, to give exact telescope stabilization also in this plane.

It would carry up too far here to describe every conceivable construction of optics with stabilization according to this invention, since an almost unlimited number of variations is conceivable. If the examples of dimensioning described above cannot be used directly, analysis of the properties possessed by the optics has to take place in every particular case when dimensioning for telescope stabilization. In the case of camera stabilization the pivot point as a rule has to be where the focus of the objective would have been located if the unstabilized optical element would not have existed, provided that light from the observed object first passes only fully stabilized optics and then only passes unstabilized optics. The unstabilized flat covering disc in front of the objective can be disregarded here.

An example of a pair of simple binoculars with image stabilization according to the present invention is described below in connection with FIGS. 8 and 9, where the binoculars are supposed to be held horizontally and the angular deflection equals zero. The optics for image reversal in the two parts of the binoculars is here essentially of the porro type. Rays from an observed object passes, in the left part of the binoculars, first the objective 1', is then reflected in the mirrors 52 and 53 stabilized together with the objective, before they reach the ocular 9' after reflection in the unstabilized mirrors 55 and 56 at right angles to each other. A corresponding path of rays exists in the right part of the binoculars. Thus, the stabilized part consists of the two objectives 1', 1" and the mirrors 46, 47, 52 and 53. This unit has a cardan mounting at the pivot point A which is placed for exact camera stabilization of the two parts of the binoculars; consequently, the focal points of the two objectives, where they would have been without the mirrors 48, 49, 55 and 56, meet at the same point where the pivot point A is situated. As seen in FIG. 9, the optical axes are here wholly in the same plane, the horizontal plane, before reflection occurs in the unstabilized mirrors.

If dimensioning for exact telescope stabilization is necessary, proportional influencing of the stabilized part may be used with advantage, as this method for natural reasons cannot give rise to possible aberrations or doubling of the images.

In order that the construction described above may be usable in practice, there is, like in any other binoculars, required a mechanism to make a variable ocular distance possible.

An example of a simple form of such mechanism is described below which has the advantage that no further optical elements are introduced and that only one movable part is used. This part consists of an ocular together with corresponding unstabilized pairs of mirrors, and this combination is rotatable around a vertical axis placed for telescope stabilization. If the right ocular 9" is chosen to be adjustable, this ocular and the mirrors 48 and 49 thus have to be rotatable as a unit a small angle around the vertical axis 58 (FIG. 8) which intersects line L and the distance of which to the pivot point A has to be as large as the focal length $f_{ok}$ of the ocular.

Figure 8:
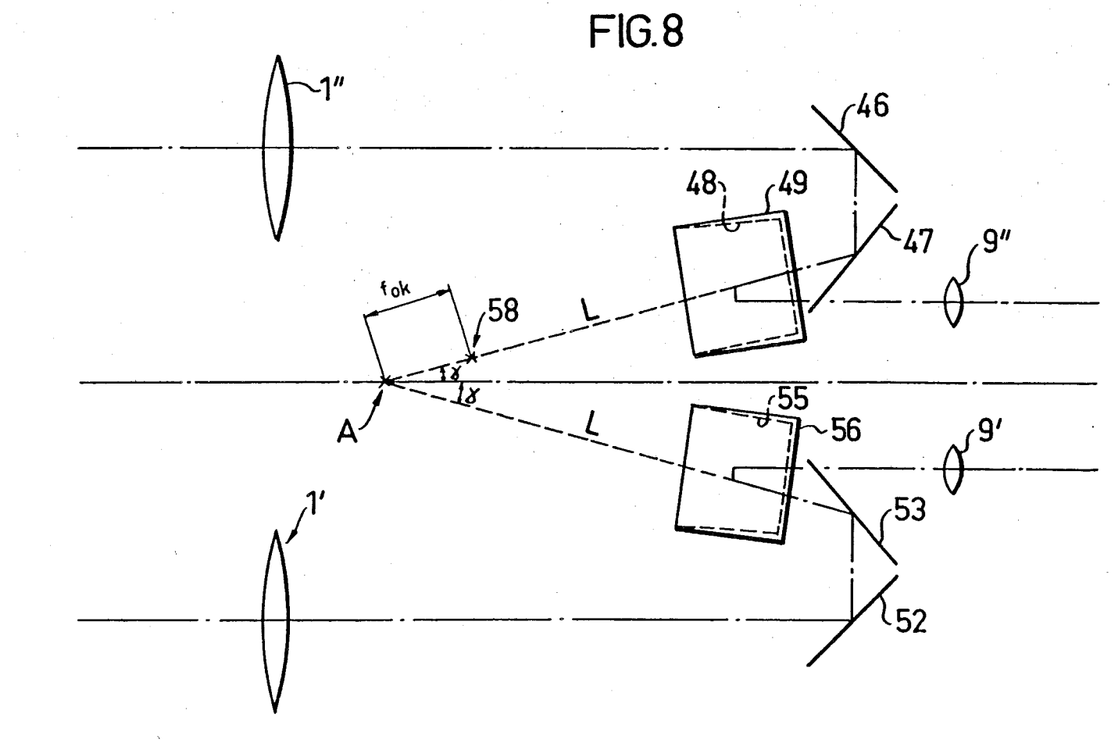
Figure 9:
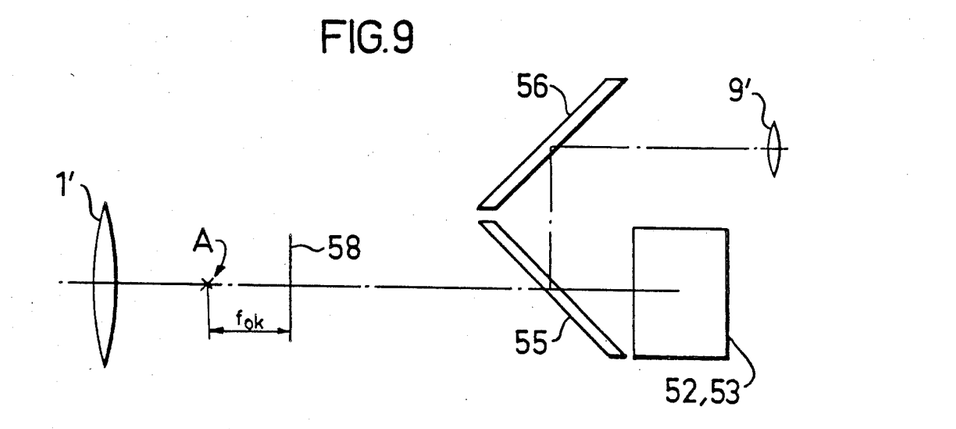
Figure 10:
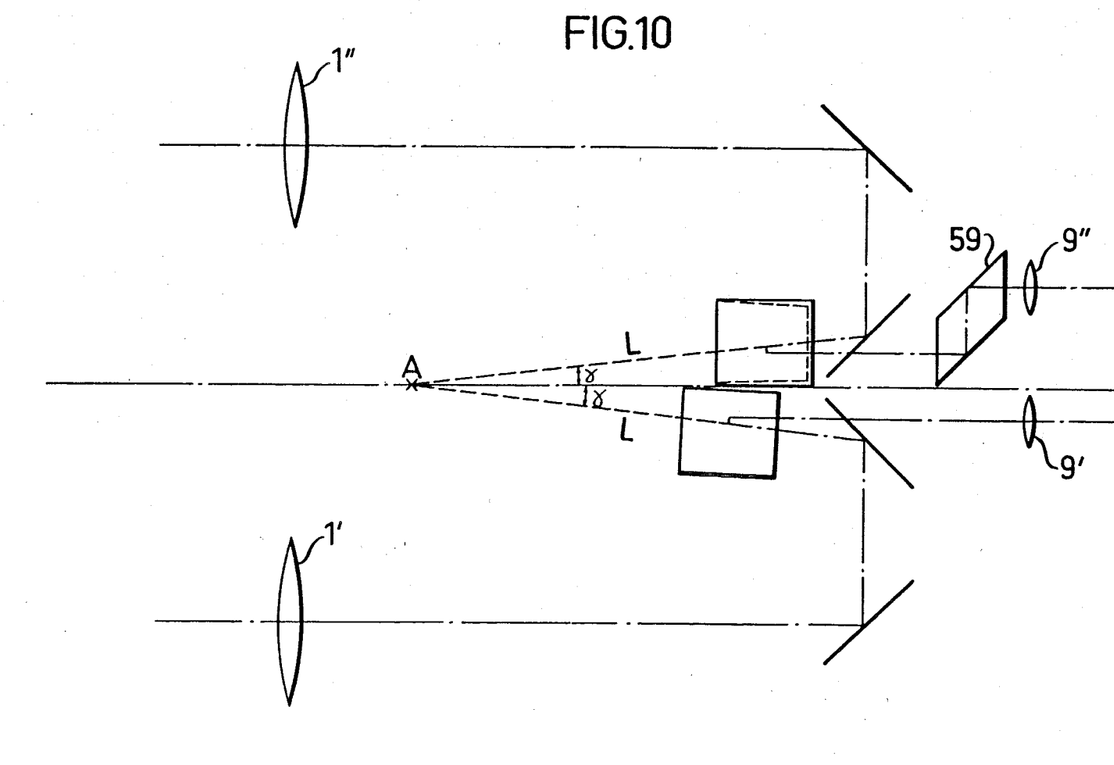
FIG. 10 shows an alternative to the latter.

Although the binoculars described above are advantageous by their simplicity, they have a disadvantage which may be troublesome in certain cases; angular deflection in the vertical plane results in rotation of the image in different directions in the two parts of the binoculars, said rotation being dependent on the angular deflection and the angle $\gamma$, see FIG. 8. A method of handling this problem is to minimize this angle, which may be achieved if an unstabilized rhombic prism 59 according to FIG. 10 is introduced, so that the necessary distance between the oculars 9' and 9" is maintained.

If the angle $\gamma$ is minimized in the way described above or otherwise, the rotation will be so small that in most cases it will probably be acceptable. It must be noted that when the angular deflection in the vertical plane is small in relation to the maximum value, which most often is the case, the rotation is also correspondingly lesser and will be zero when the angular deflection is equal to zero. At the centre of the field of image the two images are always in full accordance.

Figure 11:
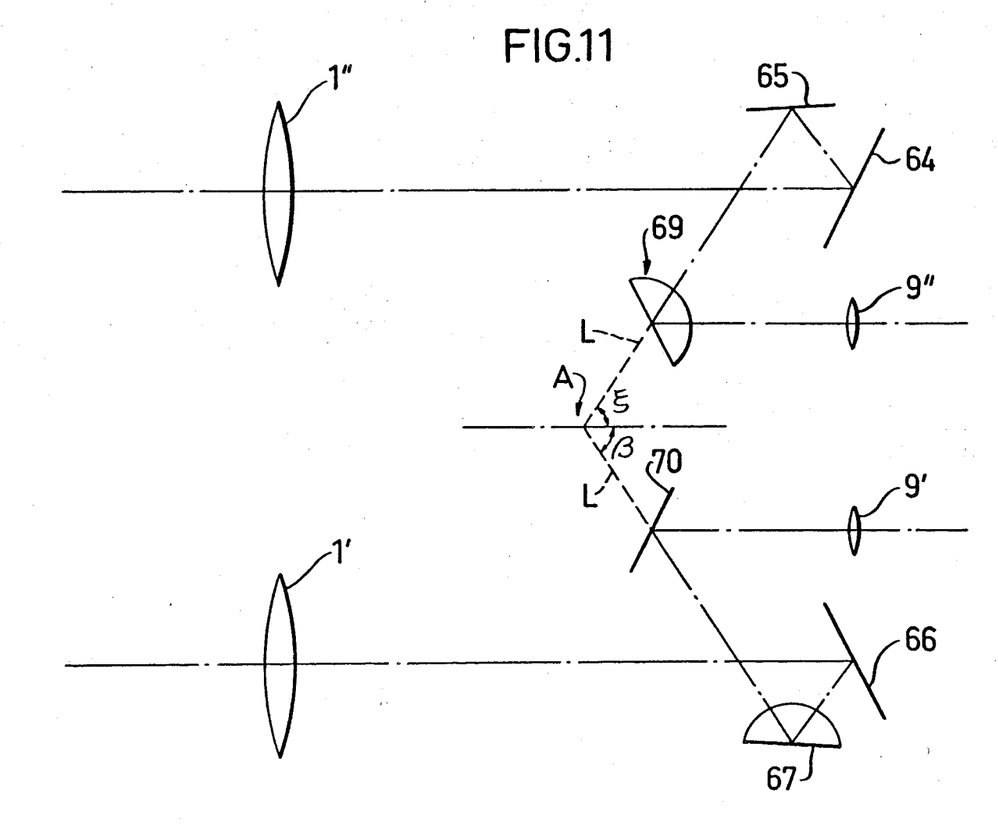
FIG. 11 shows another alternative to the application of the invention in the case of a pair of binoculars.

There is, however, a method of entirely eliminating the above problem, aiming at controlling the image rotations in such a way that they occur in the same direction and are equally great in the two parts of the binoculars. An example of this is shown in FIG. 11 where the optics in principle is the same as that of the telescope described in connection with FIG. 7. The two objectives 1' and 1", the mirrors 64, 65, 66 and the pair of roof mirrors 67 are rigidly fixed to each other and stabilized around the pivot point A which is placed for exact camera stabilization of the two parts of the binoculars. The requirement of an equally great rotation in the same direction taking place in both parts of the binoculars is that the angles $\epsilon$ and $\beta$ (see the figure) are equal and that an even/uneven number of reflections occur in the unstabilized mirror systems 69 and 70. As seen, this requirement is here satisfied; the pair of roof mirrors 69 reflects the light two times, the mirror 70 is entirely plane, consequently the light is reflected here only once. A variable ocular distance can be realized here as has been described above; which part of the binoculars is chosen for this is here unessential, since the plane mirror 70 and the pair of roof mirrors 69 here give exactly the same result at a rotation about a vertical axis. A possible dimensioning for telescope stabilization may suitably be achieved also for this construction by proportional influencing of the stabilized part.

Several advantages are common to solutions of the type described above; if the pivot point is placed at the natural centre of gravity of the stabilized part, the need for a counterweight is eliminated, which means that a practical instrument can be constructed about as small and light as the corresponding unstabilized binoculars. As seen the optical and mechanical complexity is drastically reduced compared to existing image-stabilized binoculars. Contributing to this is the construction of the stabilized part which permits that objectives of a standard type may be chosen without the introduction of image stabilization deteriorating the image quality.

Even if the invention has been described and shown with reference to certain embodiments, it is obvious that the invention is not limited to those disclosed in the specification and in the drawings and that many modifications thereof are possible for professional men.

I claim:

1. An image-stabilized optical instrument defining an optical path for the passage of optical rays therethrough, comprising a casing, an objective mounted in said casing in said optical path, a first optical element mounted in said casing in said optical path, said first optical element including at least one plane reflecting surface, a second optical element mounted in said casing in said optical path, said second optical element including at least one plane reflecting surface and being unstabilized and so substantially following the movements of the casing, at least a part of the objective being rigidly connected with the first optical element to form a stabilized unit which is rotatable in relation to the casing around at least one axis.

2. An instrument according to claim 1, wherein the stabilized unit is rotatable around at least two axes and said first optical element serves as a counterweight to said part of the objective.

3. An instrument according to claim 2, wherein each of said axes passes substantially through the imaginary straight-line extension of the optical axis of the objective through the second optical element.

4. An instrument according to claim 3, wherein said axes meet at the same point lying substantially at the focus of the objective on said imaginary extension.

5. An instrument according to claim 1 or 2, wherein the first element and the second element each comprise a pair of reflecting surfaces placed at an angle to each other.

6. An instrument according to claim 1, 2, 3 or 4, wherein said stabilized unit is arranged to rotate, within a frequency range of the rotational movement of the casing, around at least one axis with an acceleration substantially proportional to but different from the acceleration of the rotational movement of the casing in relation to space.

7. An instrument according to claim 5, wherein said stabilized unit is arranged to rotate, within a frequency range of the rotational movement of the casing, around at least one axis with an acceleration substantially proportional to but different from the acceleration of the rotational movement of the casing in relation to space.

8. An image-stabilized binocular type optical instrument defining first and second optical paths for the passage of optical rays therethrough, comprising a casing, a pair of objectives respectively mounted in said casing in said optical paths, a first pair of optical elements respectively mounted in said casing in said optical paths, each including at least one plane reflecting surface, and a second pair of optical elements respectively mounted in said casing in said optical paths, each including at least one plane reflecting surface, said second optical elements being unstabilized and so substantially following the movements of said casing, at least a part of each objective being rigidly connected with one of said first optical elements to form a stabilized unit and said units being rigidly connected to each other and being rotatable through a limited angle in relation to said casing around at least one axis.

9. An instrument according to claim 8, wherein the objectives have optical axes imaginary extensions of which meet at a point.

10. An instrument according to claim 9, wherein the stabilized units are rotatable around two axes, both intersecting the imaginary extensions of the optical axes of the objectives.

11. An instrument according to any of claim 8 to 8, wherein the second unsatabilized optical element in one of said light paths includes an even number of reflecting surfaces and the second unstabilized optical element in the other of said light paths includes an odd number of reflecting surfaces.

12. An instrument according to claim 11, wherein said stabilized unit is arranged to rotate, within a frequency range of the rotational movement of the casing, around at least one axis with an acceleration substantially proportional to but different from the acceleration of the rotational movement of the casing in relation to space.

13. An instrument according to claim 8, 9 or 10, wherein said stabilized unit is arranged to rotate, within a frequency range of the rotational movement of the casing, around at least one axis with an acceleration substantially proportional to but different from the acceleration of the rotational movement of the casing in relation to space.

* * * * *